(12) United States Patent
Cooper et al.

(10) Patent No.: US 7,321,859 B2
(45) Date of Patent: Jan. 22, 2008

(54) BILLING SYSTEM AND METHOD FOR DETERMINING TRANSPORTATION CHARGES FOR PACKAGES

(75) Inventors: Gordan C. Cooper, Toronto (CA); Todd Teal, Fort Erie (CA); Richard H. Cooper, Kleinburg (CA)

(73) Assignee: Global Sensor Systems, Inc., Mississauga, Ontario (CA)

( * ) Notice: Subject to any disclaimer, the term of this patent is extended or adjusted under 35 U.S.C. 154(b) by 542 days.

(21) Appl. No.: 10/166,572

(22) Filed: Jun. 10, 2002

(65) Prior Publication Data

US 2003/0225712 A1    Dec. 4, 2003

(30) Foreign Application Priority Data

Jun. 4, 2002    (CA)    ................................. 2388895

(51) Int. Cl.
*G06Q 99/00*    (2006.01)
*G01B 5/04*    (2006.01)

(52) U.S. Cl. .......................................... 705/1; 702/159
(58) Field of Classification Search .................... 705/1; 702/156, 159

See application file for complete search history.

(56) References Cited

U.S. PATENT DOCUMENTS

| | | | | |
|---|---|---|---|---|
| 2,708,368 A | | 5/1955 | Kolisch | ........................ 73/432 |
| 4,417,817 A | | 11/1983 | Bohme et al. | ............... 356/380 |
| 5,469,262 A | | 11/1995 | Keen et al. | .................. 356/386 |
| 5,535,127 A | | 7/1996 | Uno et al. | ............. 364/464.02 |
| 5,808,912 A | * | 9/1998 | Dlugos et al. | ............... 702/159 |
| 5,878,379 A | * | 3/1999 | Dlugos et al. | ............... 702/156 |
| 5,909,013 A | | 6/1999 | Dlugos | ..................... 177/25.11 |
| 5,914,464 A | | 6/1999 | Vogél | ........................... 177/145 |
| 6,064,629 A | * | 5/2000 | Stringer et al. | ............. 367/128 |
| 6,105,014 A | * | 8/2000 | Ramsden et al. | ............ 705/410 |
| 6,201,604 B1 | | 3/2001 | Harris et al. | ................. 356/383 |
| 2001/0034608 A1 | * | 10/2001 | Gendreau | ........................ 705/1 |

OTHER PUBLICATIONS

Hartman, Lauren R., Robot shows dexterity in palletizing, Aug. 2000, Packaging Digest, vol. 37, No. p; p. 40 (printout pp. 1-6).*
New Technology, advancements shine at CastExpo '02, Jun. 1, 2002, American Foundrymen's Society, Inc, Modern Casting, No. 6, vol. 92, p. 68. (printout pp. 1-2).*

* cited by examiner

*Primary Examiner*—Jamisue A. Plucinski
(74) *Attorney, Agent, or Firm*—Vidas, Arrett & Steinkraus, P.A.

(57) ABSTRACT

A billing system for determining package transportation charges. The billing system includes a reader to read a package identifier associated with said package and the reader generates a package identifier signal and transmits the same to a microprocessor. The billing system also includes a package sizer having a plurality of non-contact optical sensors located along each of an x, y and z axis, where each optical sensor is in a known position. The sensors are oriented relative to the conveyor so that packages passing over the sensors are detected by the sensors and produce a signal correlated to said package size. Also provided is a microprocessor to receive and correlate said package size and identifier signals, and to determine an appropriate shipping charge based upon the same. A weigh scale may also be incorporated into the system. A method of determining a transportation charge is also comprehended, which includes a self-diagnostic initialization procedure.

16 Claims, 7 Drawing Sheets

BILLING SYSTEM AND METHOD FOR DETERMINING TRANSPORTATION CHARGES FOR PACKAGES

FIELD OF THE INVENTION

This invention relates generally to the transportation of packages for a fee. More particularly, this invention relates to devices and methods used to determine an appropriate fee for transporting a package based on the size, weight or other parameters of the package.

BACKGROUND OF THE INVENTION

Many courier companies offer to pick up and deliver packages on behalf of their customers. In exchange for delivering the packages to the customer's specified destination, the courier company charges a fee. Typically the fee is based upon one or more of the size of the package, the weight of the package, the destination of the package and the urgency of the packages' delivery. Larger courier companies typically have a central sorting station. At the central sorting station packages picked up from customers are processed for delivery to the customer's specified destination.

A problem exists in determining the appropriate charge for the customer to delivery the package. In some cases, the volume of the package is the limiting constraint, especially for goods shipped by overnight air carrier. In other circumstances, the packages' weight can be the limiting factor again for example, when being shipped by air carrier. What is needed is a way of measuring a package to evaluate the appropriate shipping charge for the customer.

In the past several attempts have been made to develop such measuring devices. For example, U.S. Pat. Nos. 5,469,262 and 6,201,604 provide non-destructive remote volume measuring of packages using light beams. However, the sensing mechanisms involved are complex and expensive. This renders such devices beyond the reach of all but large courier companies.

U.S. Pat. No. 2,708,368 presents a less expensive alternative, which involves a person who places the package on an electronic measuring grid. The worker pushes the package against the grid, where it contacts trip switches. The switches are located on an x, y and z axes and a size measurement is obtained by measuring, in effect, how many switches are tripped, by direct contact between the package and the switches along each axis. However, such direct contact measuring is unreliable since most packages to be shipped are made from flexible packaging material, such as cardboard. Such flexible packaging material can soften or deform under impact and any number of switches along a packages length may not be tripped yielding a false (low) reading. Further, physical contact trip switches involve moving parts which can wear out over time, which can get gummed up and stick in an on or off position by dirt, debris or the like, and which are otherwise expensive to maintain and operate. Further, the need for a person to orient the package on the grid for measurement is expensive. Lastly, there is no way to detect whether the volume measured is at all accurate.

What is needed is a simple and reliable system for measuring the volume of a package, commonly known as "cubing" a package, and for weighing a package to determine an appropriate shipping charge.

SUMMARY OF THE INVENTION

The present invention provides a billing system for determining the transportation charges for packages. Most preferably the present invention provides an optical sensor based non-contact reading system for dimensioning or cubing the package. According to the present invention the outer dimensions of the package can be measured, without requiring physical contact or tripping of multiple switches on multiple sensing axes. Further, the present invention is simple, inexpensive and in one embodiment may be used on a continuous conveyor without the need for an attendant. The present invention also provides a way to confirm the measured or detected volume makes sense.

Another aspect of the present invention is to provide a reader for the purpose of reading a unique package identifier associated with each package. In this way, the measured size of the package can be correlated to a package identifier in a database for billing purposes.

The present invention further comprehends a microprocessor which receives the package identifier information and size information and determines an appropriate billing rate based on input destination and urgency.

In a further embodiment, a weigh scale is provided for in-line measurement of packaging weight which can then also be correlated to the unique identifier and the package volume in the microprocessor database. The present invention further comprehends a screen to display the measured size and/or weight to permit the operator to review the data for obvious input errors.

Most preferably, the volume sensing means of the present invention consists of non-contact optical sensors like diodes or phototransistors which have a change in electrical signal output according with the amount of light impinging on the sensor. By mounting the sensor behind a transparent cover, or below, or behind the plane of the package, the present invention provides a dimension measuring device which is simple and inexpensive to fabricate and easy and reliable to use.

Therefore, according to one aspect of the present invention there is provided a billing system for determining transportation charges for packages movable along a conveyor, said billing system comprising:

a reader to read a package identifier associated with said package, said reader generating a package identification signal and transmitting the signal to a microprocessor;

a package sizer having a plurality of spaced non-contact optical sensors spaced along each of an x, y and z axis, each optical sensor being located at a known position and oriented relative to said conveyor so that packages passing past said sizer are detected by said optical sensors, said sizer producing a signal correlated to a size of said package; and a microprocessor to receive and correlate said package identification signal and said package size signal for billing purposes, said microprocessor including pre-input data on billing charges, whereby said measured package size can be compared to said pre-input data to determine a transportation charge for said package.

According to another aspect of the invention, there is provided a method of determining transportation charges for packages by using a billing system having non-contact optical sensors, said method comprising the steps of:

identifying a package by means of a reader;

positioning the package on a sensing grid;

measuring one or more of a weight and volume of the package;

correlating the package identifier said measured weight and volume of said package in a database;

displaying the measured weight and volume;

determining a charge for said package based upon said measured weight and volume upon acceptance of the displayed package parameters.

BRIEF DESCRIPTION OF THE DRAWINGS

Reference will now be made to drawings, which illustrate, by way of example only, preferred embodiments of the present invention and in which.

DETAILED DESCRIPTION OF THE PREFERRED EMBODIMENTS

Figure 1:
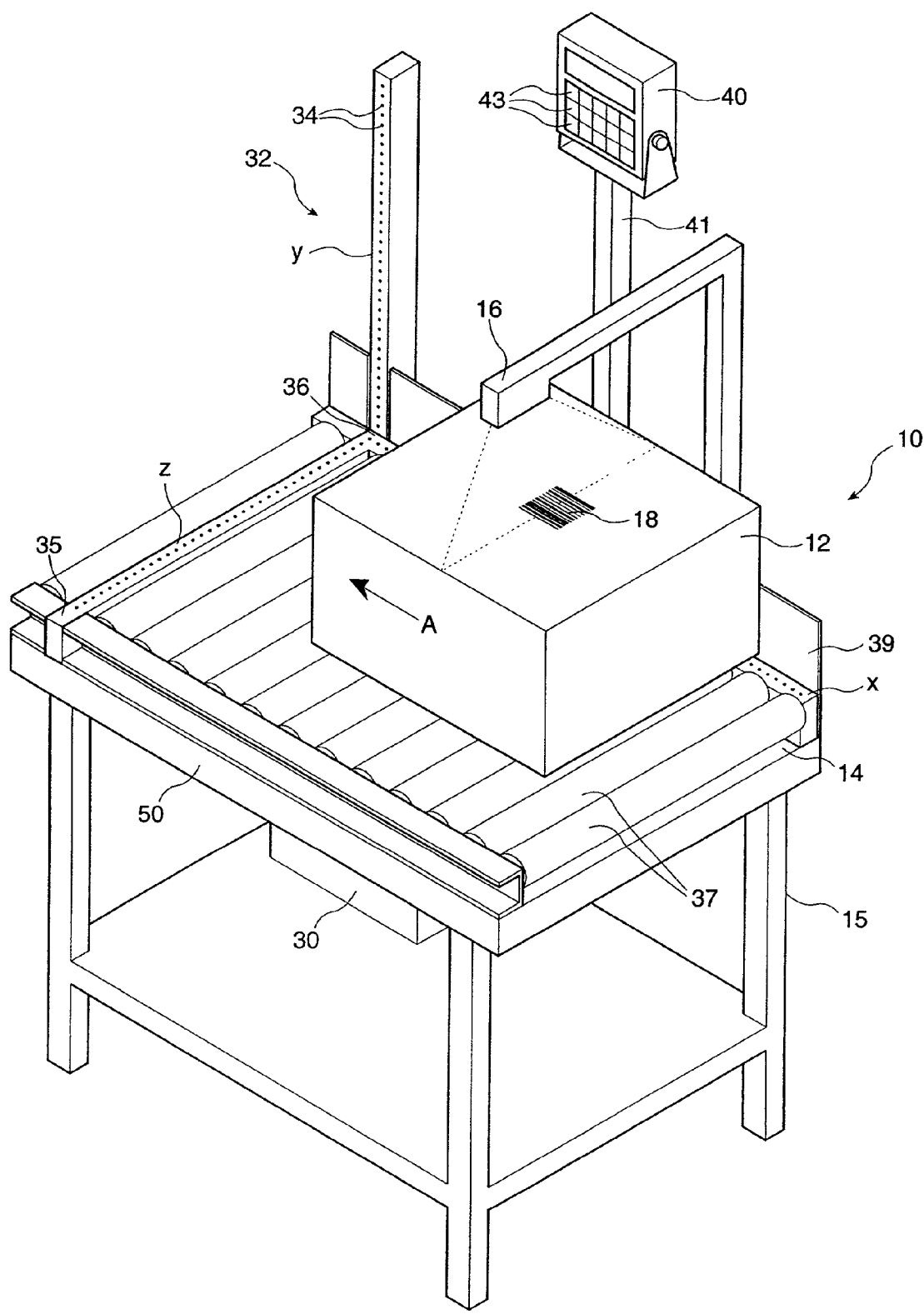
FIG. 1 is a side view of a system according to the present invention.
Figure 2:
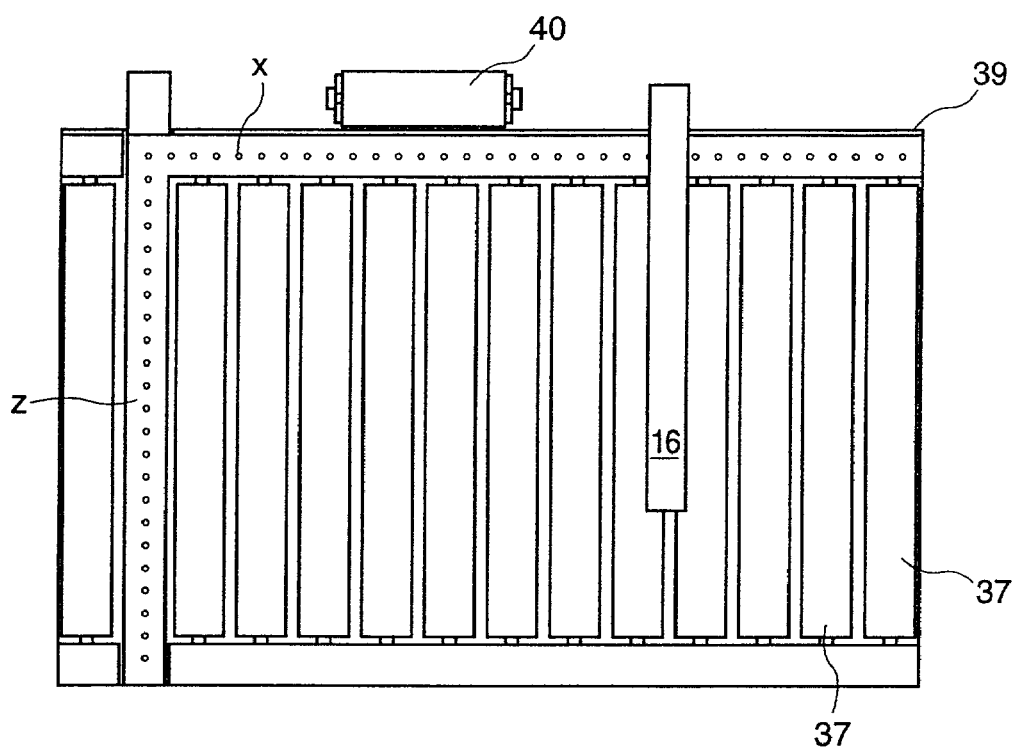
FIG. 2 is a top view of the system of FIG. 1.
Figure 4:
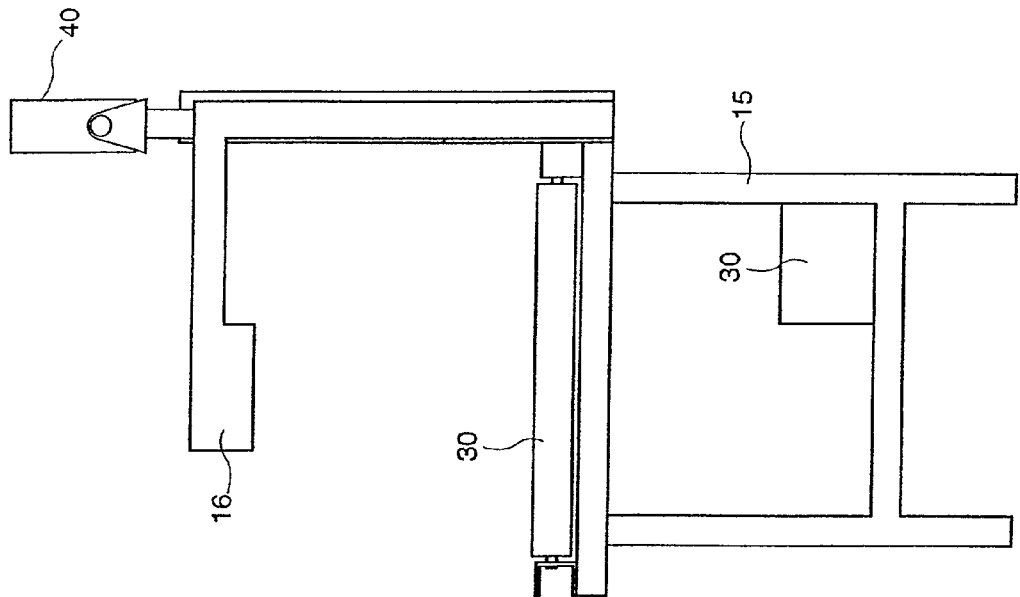
FIG. 4 is an end view of the system of FIG. 1 shows a panel display according to the present invention.
Figure 3:
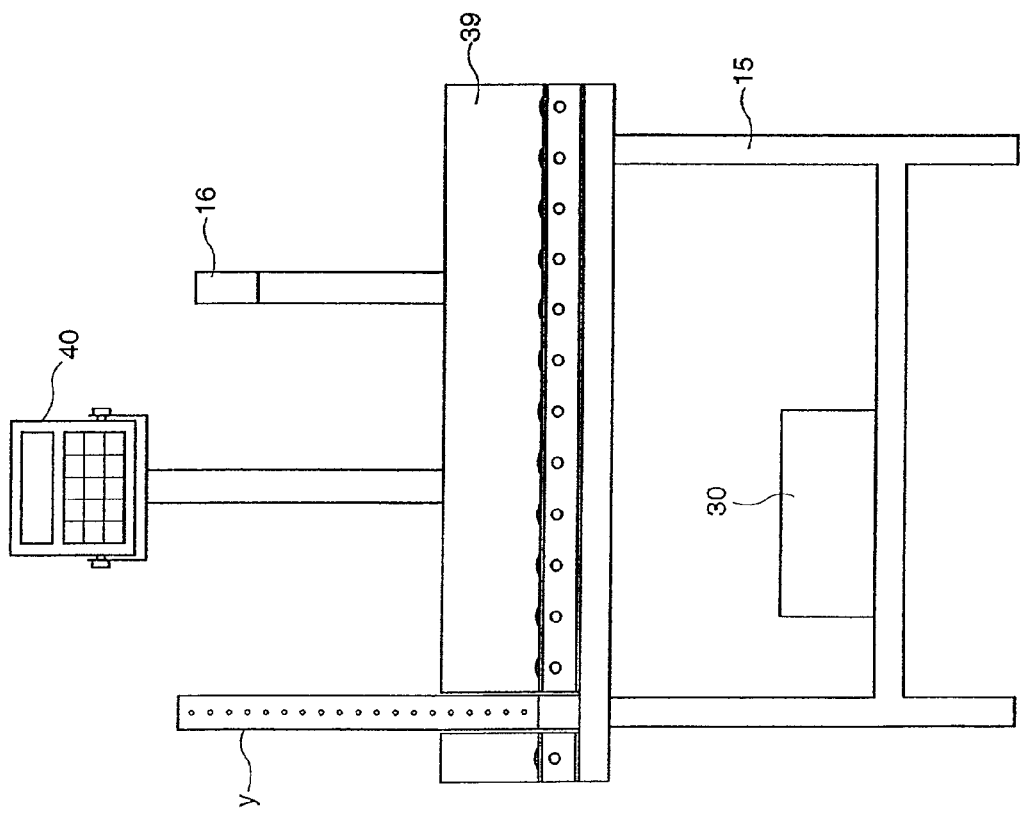
FIG. 3 is a front view of the system of FIG. 1 an optical sensor according to the present invention.

FIG. 1 shows a billing system 10 according to the present invention for determining transportation charges for packages 12 moving along a conveyor 14. As shown, the system 10 is carried on a separate stand 15, which allows the system 10 to function as a stand alone unit. However, the present invention also comprehends building the system 10 into a conveyor line without a separate stand 15.

The billing system 10 includes a reader 16 to read a package identifier 18 on the package 12. It will be understood by those skilled in the art that there are many forms of package identifier 18 and reader 16. For example, the reader 16 may be an optical scanner, and may read a digital bar code identifier on the package which, may for example, be a waybill number. Alternatively, the package may be equipped with a RIF tag which may be read by an appropriate RIF tag reader. Other forms of identifiers and readers are comprehended by the present invention, but the optical scanner and bar code tag provide inexpensive and accurate results. Also, while a fixed scanner 16 is shown, a hand held scanner may also be used and is comprehended by the present invention. The output from the reader 16 is a package identification signal, which is communicated to a microprocessor 30.

The next element of the billing system is a package sizer 32 having a plurality of spaced optical sensors 34. A number of sensors 34 are located along each of an x, y and z axis as shown. Most preferably, the x, y and z axes are perpendicularly oriented relative to the conveyor 14. In this way it is easy to calibrate the signals to package size when the packages passing along the conveyor 14 are detected by the optical sensors. However, the present invention comprehends orienting the axes of optical sensors in any configuration which still provides a reading of a package dimension. Thus, the axes could be skewed, and calibrated, without departing from the scope of the present invention. In this sense calibrated means the positions of individual sensors are known.

As can be seen from FIG. 1, the optical sensors 34 are spaced along the axes in the x, y, or z directions. The intersection point of the axes is referred to as the origin 36. In this manner, each optical sensor is at a defined distance from the origin 36. Most preferably, according to the present invention, the optical sensors are in the form of silicon phototransistors such as the SDP Series made by Honeywell. Such phototransistors can detect the change in the amount of light that impinges upon the sensor and thus can sense when an object passes over the sensor. When such a change is detected, an electrical signal is produced. By knowing the position of the sensor producing the signal, a package measurement can be obtained as explained in more detail below.

The preferred optical sensors are non-contact sensors. Such sensors are accurate and sensitive enough to respond to a change in light, caused by an object passing over the LED. Optionally the optical sensors 34 are protected by a transparent cover 35. Alternatively, the optical sensors can be placed in a non-contact position, just behind a plane defining one side of the package. For example, in the preferred embodiment, the system 10 includes rollers 37 as part of the conveyor 14. The rollers 37 are mounted on bearings (not shown) in the usual manner to permit the packages to be easily moved along the stand 15, first past the reader 16, then past the sizer 32. The packages move in the direction of arrow A in this example, but may move in either direction without departing from the scope of the present invention. The optical sensor can be located as shown between a pair of adjacent rollers, but below the level of the top of the rollers. In this way, the package will pass closely over the sensors, without needing to actually contact the sensor to generate a reading.

The accuracy of the measurement of the sizer 32 will be a function of detecting the outside edges of the package 12. If the sensors 34 are spaced more closely together, a more precise measurement of the outer dimensions of the package 12 can be obtained. Contrarily, if the spacing of the sensors 34 is further apart, then the size of the package 12 is less precisely measured. Placing the sensors 34 at ½ inch intervals has yielded reasonable results, but the present invention comprehends other spacings such as ½ cm or the like. Further, it may be desired not to measure small packages at all, medium packages quite precisely and large packages less precisely. In some cases, packages below a certain size will not be billed according to size as a minimum charge will apply. Thus, in one form of the invention, no sensors 34 would be located adjacent to the origin, sensors quite closely spaced would then follow, and lastly widely spaced sensors would be located on the outermost part of the x, y and z axes.

It can also be desirable to measure the size of small packages, in which case more closely spaced sensors may be used to reduce measurement error. Thus, a preferred form of the present invention is to have closely spaced sensors closest to the origin, such as 1 mm apart for the first 10 cm, and then, further from the origin have more widely spaced sensors, such as every 5 mm. Unlike the prior art which determined a package dimension by summing the outputs of all the tripped switches, the present invention relies upon identifying each sensor 34 and its position. Thus, rather than taking all of the signals, which compounds any errors in reading, the present invention simply utilizes the outermost sensor which generates an output corresponding to a change in the amount of light, as a proxy for the outside edge of the package 12 to determine the package size. Thus, the sensing errors, if any, are not cumulative as in the prior art. Further, the present invention will use, as a reading, the last covered sensor 34 of a continuous set of covered sensors 34. Thus, if for some reason one sensor 34 is covered, the next one is uncovered, and then further away from the origin a few more sensors 34 are covered and producing readings, the present invention utilizes only the last one of the set of covered sensors 34 as the measurement point. In this way, stray readings from non-package items such as an operator's hand or any other matter which could cause a false reading will not throw off the accurate measurement of the package.

As can now be appreciated, to accurately sense package 12 size in all three dimensions, x, y and z, requires that the package 12 pass over three sets of calibrated (as to position) sensors 34. Thus it is preferred to cause one corner of the package 12 to momentarily be located at the origin 36, to lie against the x, y and z axes. Thus the package 12 can pass an upright surface 39 in which the y axis is located while at the same time passing over the x and z axes. In such a case, only the outermost width sensor 34, the topmost height sensor 34 and the outermost length sensor 43 need be used. As the position of each sensor is known, taking a reading from any given sensor will provide a package dimension measurement.

Figure 7:
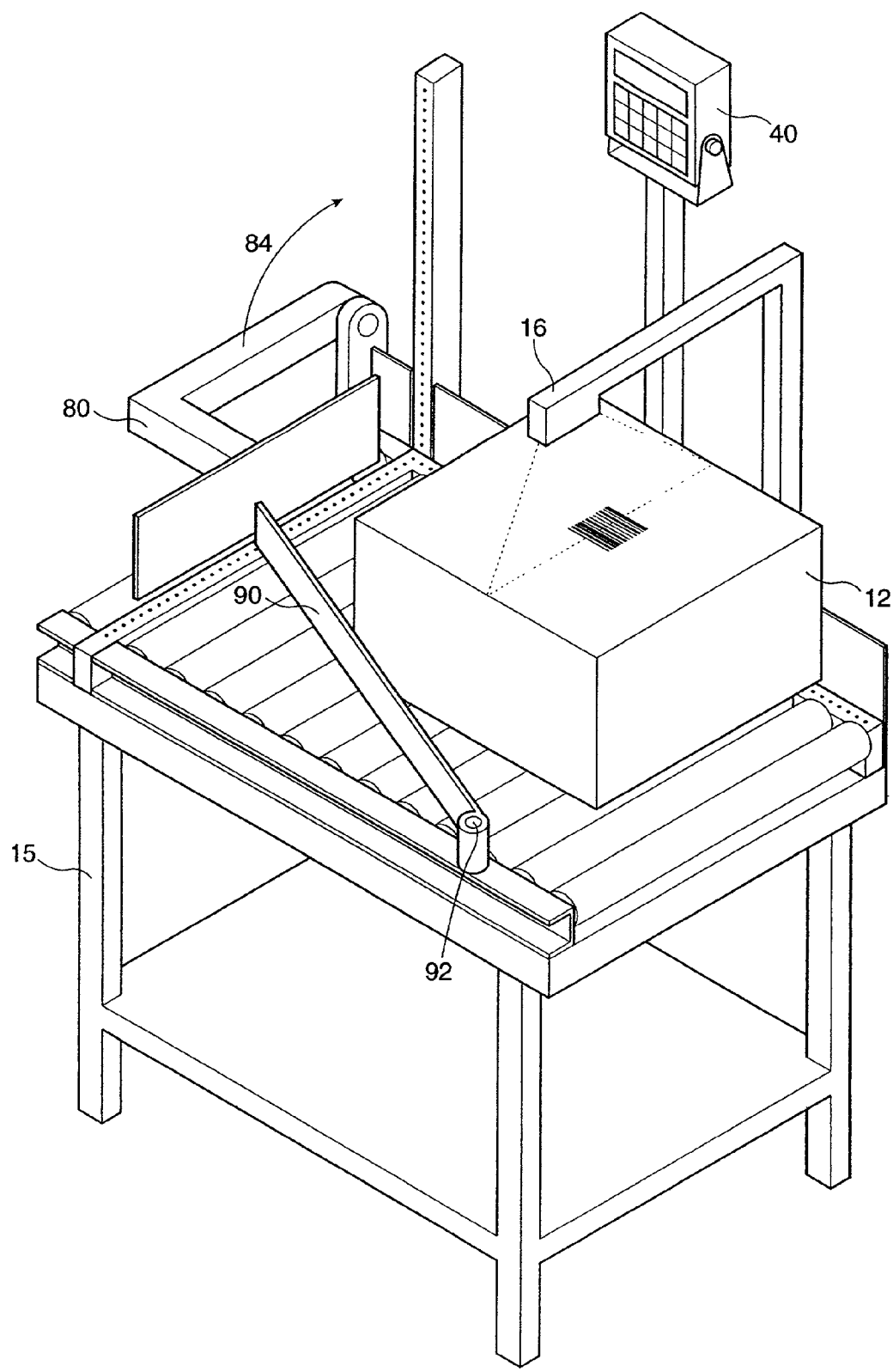
FIG. 7 shows a further embodiment of the present invention.
Figure 8:
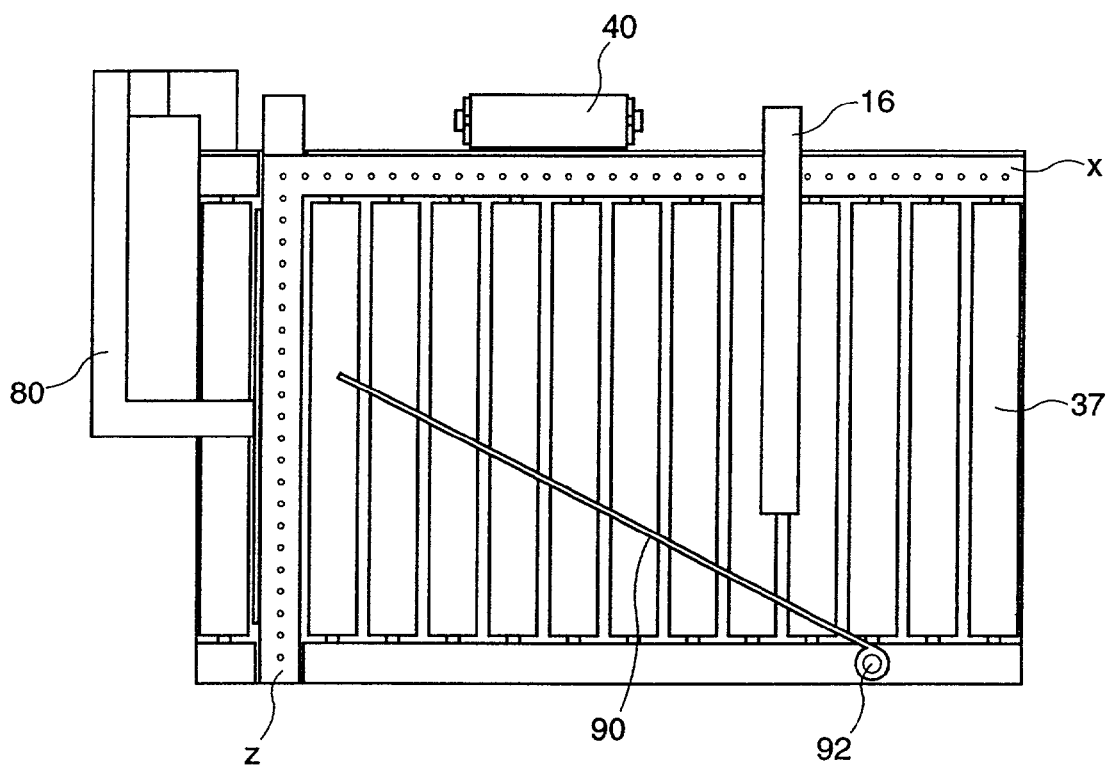
FIG. 8 shows the embodiment of FIG. 7 from above.

For the purpose of obtaining a reading, it is most appropriate to temporarily stop the package 12 on the conveyor 14, and position the package 12 against the measurement axes. In the embodiment of FIGS. 1 to 4, this is done manually by a worker who slides the package into position against wall 39. A fixed stop edge can be provided extending out from the back wall to ensure accurate alignment. In the embodiment of FIGS. 7 and 8, the stop is automatically moved by mechanical means as explained below. Once the package 12 is placed with one corner at the origin 36 a measurement of all three dimensions can be taken. The measurement takes the form of an electronic output signal which is sent to and received by the microprocessor 30.

Associated with the microprocessor 30 is a monitor or display 40 as shown in FIG. 1. It may be mounted on a mast 41, and include input buttons 43, which are explained in more detail below. Alternatively it may be mounted at any convenient location where it is easily visible to an operator, such as in front of the scale. The purpose of the monitor 40 is to provide a visual display of the readings made by the system 10. For example, when the package 12 is manually positioned on the measurement axes, the operator can simply observe the measured amount and thereby ensure that the reading is a good reading. Then the operator can release the package to let it continue along the conveyor for destination sorting or the like. An advantage of the present invention which displays the measured parameters is that the operator has an opportunity to check the measurements by eyeballing the actual package 12 size. The estimated value will be arrived at either through the operator's experience, or, through general knowledge. For example, if a one foot by one foot by one foot package is displayed as being 9 cubic feet, the operator will clearly know that a measurement error has occurred and can remove and remeasure the package 12 before a bill is produced for the shipping customer.

Also associated with the conveyor 14 is an inline weigh scale 50 which most preferably is built into the support structure for the sizer system 32. Thus, the present invention comprehends that the weight of the package 12 can be determined, either as the package 12 is moved to the sizer 32, or even while the sizer 32 measurements are being taken. Weight scales from Matrix Scale Service in Mississauga, Ontario have been found to yield reasonable results in providing an output signal which can be converted into a weight reading. The weigh scale can weigh the individual weight of packages 12, and in this fashion both the weight and the volume of a package 12 can be measured and correlated to the package identifier in the microprocessor.

Figure 5:
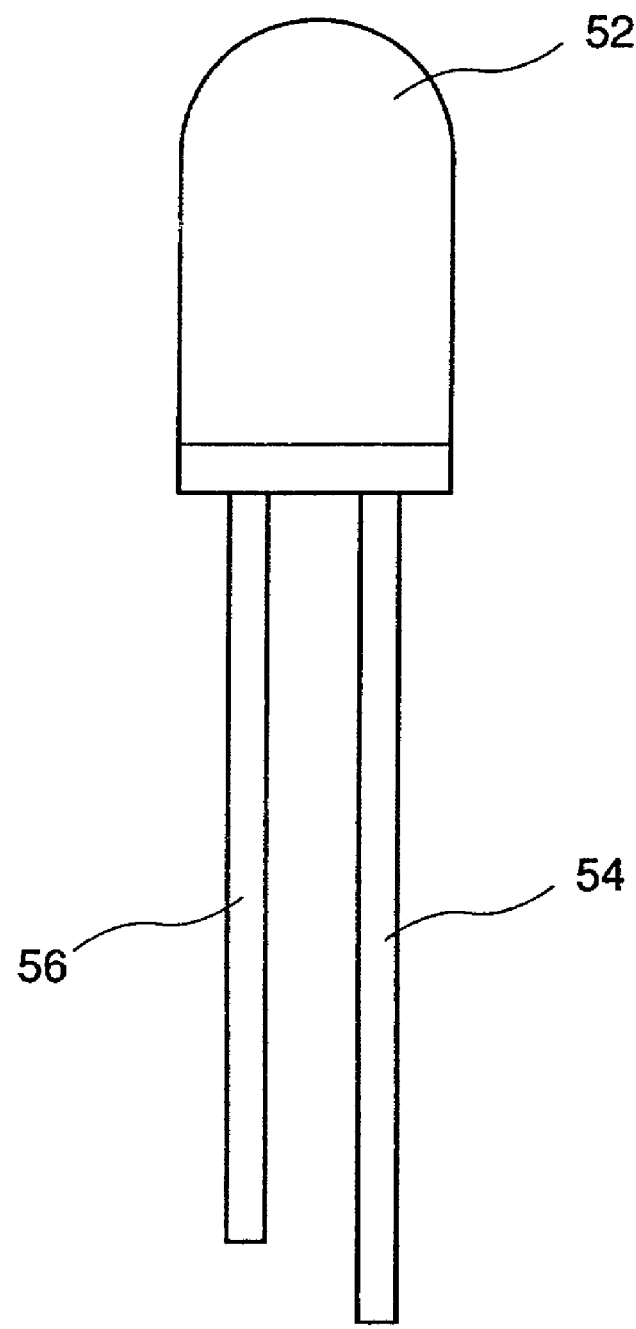
FIG. 5 is a detailed view of an optical sensor according to the present invention.

Turning now to FIG. 5, a side view of an optical sensor, such as a phototransistor is provided. It includes a detection surface 52, and a pair of electrical leads 54, 56. The phototransistor works in a known manner and thus is not described in any more detail herein. Other types of non-contact sensors are comprehended by the present invention, but the phototransistors have provided reasonable results and are thus preferred.

Figure 6:
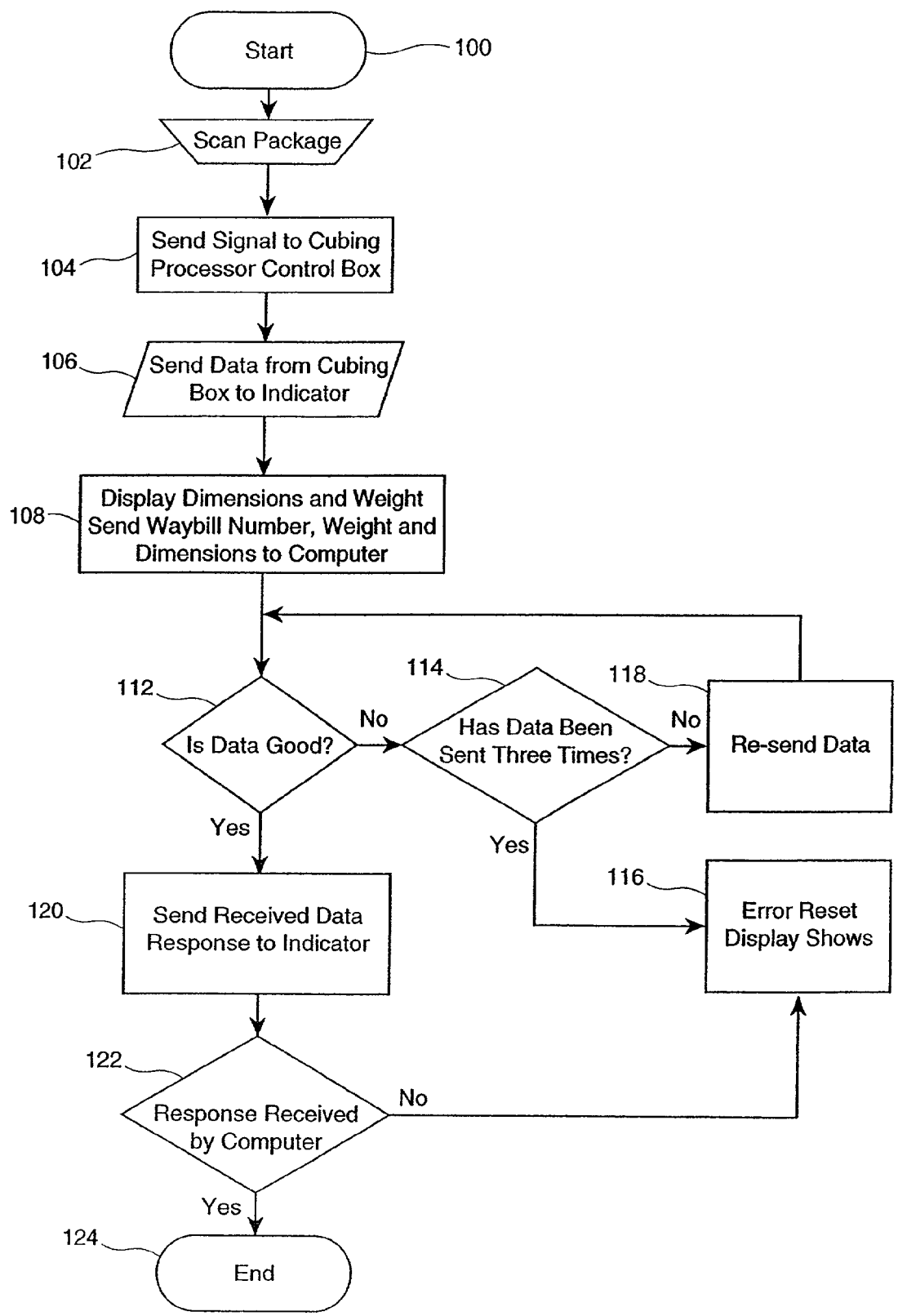
FIG. 6 shows an algorithm for the microprocessor to receive and correlate measured parameters for billing purposes.

Turning now to FIG. 6, an exemplary flow chart for the implementation of a billing system according to the present invention is provided. The first step is a test procedure when the system is first turned on, the microcontroller automatically performs a test to confirm that all of the phototransistors are working, and to verify that the required amount of light is present for the sensors to operate. If a problem is present the display will indicate an error, and that servicing is required. To assist, the display will indicate what the problem is.

The system is then ready for packages, indicated by start 100. The start step may be initiated, for example by the optical reader sensing a package identifier. At the next step 102, the package is scanned. At this point, the scanning takes the form of weighing the package by means of the inline weigh scale 50 incorporated into the support stand 15, and cubing the package with sizer 32, namely, identifying the volume of the package by use of the non-contact optical sensors placed at predetermined positions in the three optical sensing or measurement axes as explained above. Once the readings are made, the information is sent as an electronic signal to a cubing processor control box, which converts the electronic signals into data signals at step 104. Then, at step 106, the data is sent from the cubing process control box to a display or monitor. Then, at step 108, the monitor displays the dimensions, the weight, the waybill number and any other pertinent information for the package. At this point, the information can be viewed by the operator, if any, and generally verified as to its apparent accuracy.

The next step at 112, is to send the verified data to the billing computer (not shown) for the system. The billing computer is responsible for correlating the electronic data to a scale of charges to determine the appropriate waybill charge for the shipping customer. This can be done by look-up table or the like, where pre-input billing charges are provided for specific package sizes or ranges of sizes. Prior to actually producing a waybill, the data is checked to determine whether or not it is good. For example, the computer ensures that the waybill number has the appropriate number of digits, and that the weight and volume that were measured fall within acceptable parameters. If the information is not acceptable, then, the program at step 114 questions whether or not the data has been sent three times. At 116, if the data has already been sent three times and is still not acceptable, then an error message is sent to the display, in which case the package is removed and reinserted into the conveyor belt for remeasuring. If the data has not been sent a predetermined number of times, then at step 118, the data is resent to the microcomputer.

At step 112, if the data is good, then an acknowledgement of received data is sent to the display at 120 so that the operator knows the information has been recorded into the computer database. Once the data has been confirmed as being displayed, then the program ends at 124 and is ready to receive the next package for weighing. If for some reason the data is not displayed at 122, then the program reverts to an error reset and the package must be remeasured back at step 102.

The next stage is to determine the billing charges for the package. There are many different ways for determining the billing charges, and various multipliers can be used for distance, urgency, and weight and/or volume. Having the relevant billing information pre-input into a microprocessor in electronic form means that the microprocessor can generate a bill appropriate to the package volume, weight, destination and urgency.

Turning now to FIG. 7, an automated version of the present invention is shown. The same numbers are used for the same components as appear in the first embodiment. In this version no operator is required, and the conveyor automatically moves the packages along by means of powered rollers or the like. As shown, stop arm 80 is provided which is mounted above the conveyor. The stop arm 80 is preferably actuable between a stop position and a release position in direction of arrow 84. In the stop position, the stop arm 80 causes the package to be restrained against the measurement axis at the origin 36. Upon receiving a valid signal, the microprocessor can then provide an output signal to the stop arm 80 to release the stop arm 80 and let the package continue on its way by pivoting up in direction of arrow 84. In this manner, hands free package measuring can be accomplished.

In many cases it will be necessary to also ensure that the package is placed against the far side of the sizer, to ensure good measurements on the x axis and the y axis of the sizer. Thus, a positioning arm 90 is provided, which pivots about 92. A predetermined torque is used to ensure that packages are pushed laterally against the x and y measurement axes, but the positioning arm 90 will also pivot to let larger packages through. The precise electromechanical control of the pivoting arm 90 can vary, as will be understood by those skilled in the art. What this embodiment of the present invention comprehends, is an automatic means to position the package momentarily on the sensing grid to permit the appropriate measurements to be made.

It will be understood by those skilled in the art that while reference has been made to preferred embodiments of the present invention, the form of the present invention can vary without departing from the scope of the claims which are attached. Some of these variations have been discussed above and others will be apparent to those skilled in the art. For example, various forms of reader can be used to associate the unique package identifier with the package being measured.

We claim:

1. A billing system for determining transportation charges for packages movable along a conveyor, said billing system comprising:
    a reader to read a package identifier associated with said package, said reader generating a package identification signal and transmitting the signal to a microprocessor;
    a package sizer having (1) a first plurality of spaced non-contact optical sensors spaced along an x-axis, (2) a second plurality of spaced non-contact optical sensors spaced along a y-axis, and (3) a third plurality of spaced non-contact optical sensors spaced along a z-axis, each optical sensor being located at a known position and oriented relative to said conveyor so that packages passing past said sizer are detected by a reduction in an amount of ambient light reaching at least a portion of said optical sensors being covered by said packages, said sizer producing a signal correlated to a size of said package; and
    a microprocessor to receive and correlate said package identification signal and said package size signal for billing purposes, said microprocessor including a data table for billing charges based on package sizes, whereby said measured package size can be compared to said data table to determine a transportation charge for said measured package.

2. A billing system as claimed in claim 1 further including a weigh scale associated with said sizer, said weigh scale sensing a weight of each of said packages on said sizer and producing a weight signal, wherein said microprocessor receives said weight signal and correlates the weight signal with said package identification signal and said package size signal for billing purposes.

3. A billing system as claimed in claim 1 further including a stop to position said packages relative to said optical sensors for accurate size measurement.

4. A billing system as claimed in claim 3 wherein said stop includes a stop arm which is moveable between a package volume sensing position and a package passing position.

5. A billing system as claimed in claim 1 wherein said microprocessor includes a display to display one or more package parameters.

6. A billing system as claimed in claim 5 wherein said display is configured to display at least a measured package volume and a measured package weight.

7. A billing system as claimed in claim 1 wherein said optical sensors further comprise a plurality of light detecting phototransistors, which detect whether an object is passing thereover.

8. A billing system as claimed in claim 7 wherein said light detecting phototransistors are located behind a transparent shield whereby the packages being sized are remotely measured.

9. A billing system as claimed in claim 8 wherein a dimension of a package is measured by determining the distance between a pair of spaced apart diodes which detect the presence of said package, each of said diodes in said pair being a last diode spaced along each of said x, y and z axes to detect the presence of said package.

10. A method of determining transportation charges for packages by using a billing system having non-contact optical sensors, said method comprising the steps of:
    identifying a package by means of a reader;
    positioning the package on a sensing grid, wherein the grid has a first plurality of spaced non-contact optical sensors spaced along an x-axis, a second plurality of spaced non-contact optical sensors spaced along a y-axis, and a third plurality of spaced non-contact optical sensors spaced along a z-axis, wherein said x-, y- and z-axes are mutually non-parallel; said positioning being accomplished by at least partially covering said optical sensors by said packages, at least a portion of said optical snsors being covered by said packages, at least a portion of said optical sensors being covered by said packages;
    measuring volume of the package, by determining a package dimension in each of the x, y and z dimensions of said package positioned on said sensing grid, wherein said package dimensions are determined by detecting a reduction in an amount of ambient light reaching said sensors;
    weighing said package;
    correlating the package identifier with said measured weight and volume of said package in a database;
    displaying the measured weight and volume; and
    determining a charge for said package based upon said measured weight and volume upon acceptance of the displayed package parameters.

11. A method of determining transportation charges for a package as claimed in claim 10 wherein said method further includes an initialization step, in which all of the non-contact optical sensors are temporarily energized to permit visual verification of system operation.

12. A method of determining transportation charges for a package as claimed in claim 11 further including the step of checking each optical sensor upon start up and detecting any faults therein.

13. A method of determining transportation charges for a package as claimed in claim 12 further including the step of displaying an error message upon a fault being detected in anoptical sensor.

14. A method of determining transportation charges for a package as claimed in claim 13 further including the step of identifying a location of said detected fault and displaying the same.

15. A billing system as claimed in claim 1, wherein the x-, y- and z-axes are substantially mutually perpendicular.

16. A method as claimed in claim 10, wherein the x-, y- and z-axes are substantially mutually perpendicular.

* * * * *